United States Patent [19]

Negishi

[11] Patent Number: 4,916,546
[45] Date of Patent: Apr. 10, 1990

[54] IMAGE ORGANIZING UNIT OF A LASER BEAM PRINTER

[75] Inventor: Kiyoshi Negishi, Tsurugashima, Japan

[73] Assignee: Asahi Kogaku Kogyo Kabushiki Kaisha, Tokyo, Japan

[21] Appl. No.: 232,766

[22] Filed: Aug. 16, 1988

[30] Foreign Application Priority Data

Aug. 21, 1987 [JP] Japan .................. 62-127187[U]

[51] Int. Cl.[4] .................. G01D 9/42; G01D 15/14; G01D 15/26; H04N 1/04
[52] U.S. Cl. .................. 358/296; 346/108; 346/160
[58] Field of Search .......... 358/296, 300, 302; 346/108, 76 L, 160

[56] References Cited

U.S. PATENT DOCUMENTS 4,549,222 10/1985 Fogaroli .................. 358/296

Primary Examiner—Bruce A. Reynolds
Assistant Examiner—Scott Rogers
Attorney, Agent, or Firm—Sandler, Greenblum & Bernstein

[57] ABSTRACT

An image organizing unit for use in a laser beam printer. The image organizing unit comprises a character generator which has a plurality of character patterns, each of which has a larger number of pattern elements along the width direction than that corresponding to a resolving power of the printer. A main-scanning clock pulse frequency is also set to be higher than that corresponding to the resolving power of the printer. With the thus constructed image organizing unit, the printing quality can be improved, particularly for oblique lines of characters, with the resolving power of the printer remaining unchanged.

9 Claims, 2 Drawing Sheets

IMAGE ORGANIZING UNIT OF A LASER BEAM PRINTER

BACKGROUND OF THE INVENTION

This invention relates to an image organizing unit of a laser beam printer, and more particularly, to an image organizing, unit capable of modulating the organization of an oblique line image without improving the receiving power of the printer.

Recently, there has become widespread a so-called laser beam printer in which the charged surface of a photoconductive member is exposed, to form a latent image, to a laser beam modulated on the basis of printing information inputted from, for instance, an external host computer. With the latent image thus formed, a hard-copy is electrophotographically obtained through a toner-image development process, a transferring process, and a fixing process. Particularly, a semi-conductor laser beam printer has been applied in actual use as is compact in size and light in weight.

The laser beam printer has features, in comparison to conventional printers, such as fast printing speed, multiplicity of recording methods, high quality of printed impression, low noise at printing operation, and employability of usual papers, etc. Therefore, needs for the laser beam printer are rapidly increasing, such as for information outputting terminal equipment to be connected to computers or the like which are required for so-called Office Automation.

In the laser beam printer, generally, quality of a printed impression depends upon a, resolving power of the printer, and this resolving power depends upon the spectral sensitivity of a photoconductive member, the spot diameter of the beam, the beam intensity, and the scanning speed of the photoconductive member.

In case the printer is connected to a computer or the like as its outputting equipment, the number of characters to be used is usually not more than the number of character codes defined by ASCII (American Standard Code for Information Interchange), and therefore the printing quality, i.e., the resolving power does not matter so much. In this connection, it is enough to set the resolving power to be 120 DPI (Dots Per Inch). Thus, usually a frame-size and a character-size of each character data stored in a character generator are composed respectively to be 120 DPI and 1/6 inch.

However, there exists a problem that in case the frame-size and the character-size of each character data are determined as above, an oblique line of the character has an awful impression. For example, the character pattern of "A" comprises 10-dots (width)×20-dots (height), as illustrated in FIG. 3, in case the characters are to be printed at a rate of 12 characters per inch and 6 lines per inch. Thus, oblique lines of the character "A" are not represented smoothly.

SUMMARY OF THE INVENTION

It is therefore an object of the invention to provide an image organizing unit of a laser beam printer capable of modulating the organization of an oblique line image without improving the resolving power of the printer.

For the above purpose, according to the invention, there is provided an image organizing unit of a laser beam printer in which a character pattern to be printed corresponding to a predetermined printing code is retrieved in a character generator and is, read out in synchronization with a predetermined main-scanning clock pulse to form an image signal, and the laser beam is ON/OFF modulated in accordance with said image signal, the improvement which comprises in that the number of bits outputted from said character generator is larger than the number of bits determined by the resolving power of the printer, and that the frequency of said main-scanning clock pulse is higher than the frequency corresponding to said resolving power in proportion to said increment of the number of bits outputted from said character generator.

DESCRIPTION OF THE ACCOMPANYING DRAWINGS

DESCRIPTION OF THE PREFERRED

Figure 1:
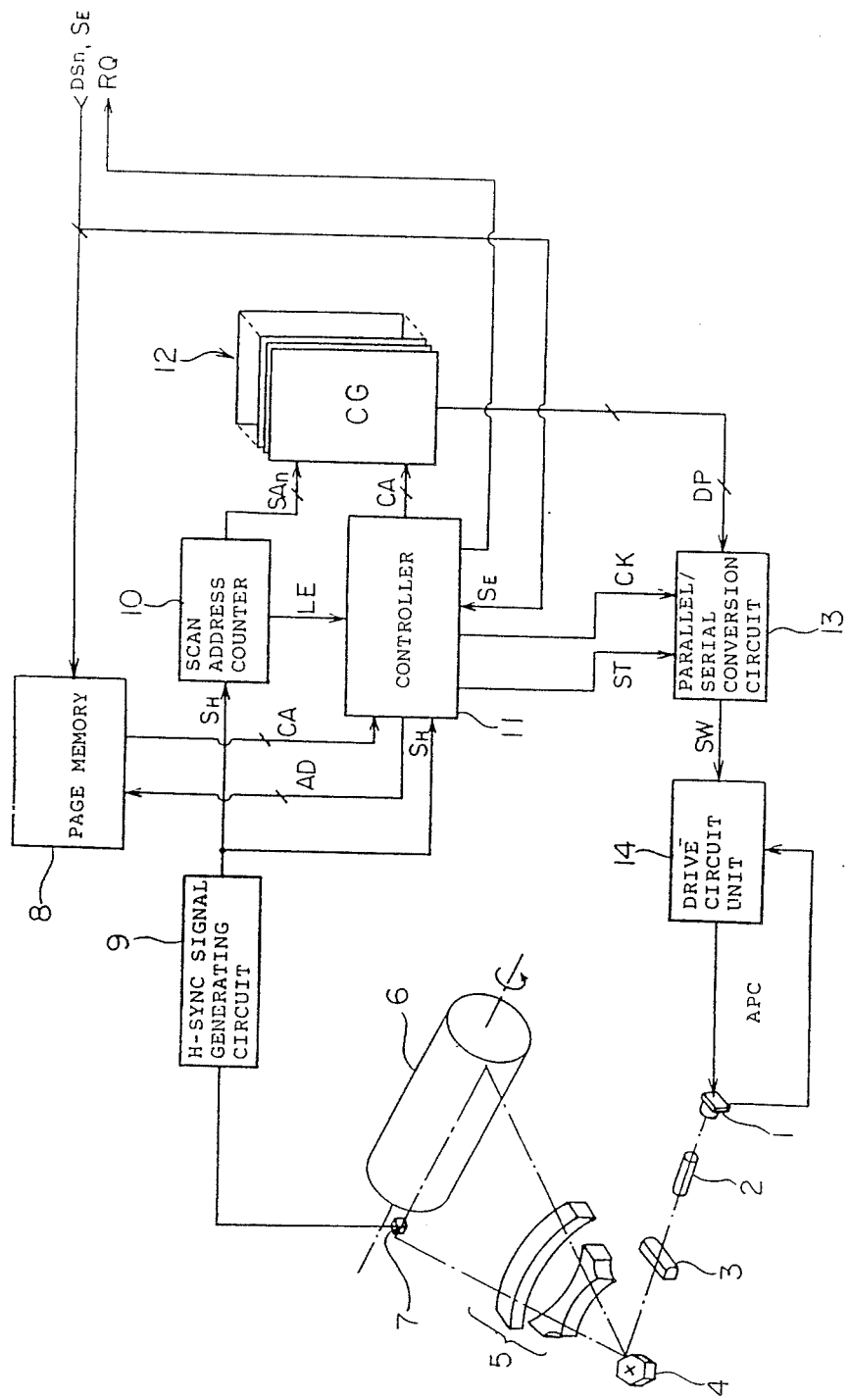
FIG. 1 shows an image organizing unit of a laser beam printer embodying the invention.

In a laser beam printer illustrated in FIG. 1, a laser beam emitted from a semi-conductor laser 1 and passed through a collimator lens 2 and a beam shaper 3 is deflected by a polygonal mirror 4 to carry out main-scannings over a photoconductive drum 6 via a $f\theta$ lens 5. During the main-scannings being repeatedly carried out, the photoconductive drum 6 is rotated about, its axis in a direction indicated by an arrow in FIG. 1 to carry out an auxiliary-scanning. A latent image is then formed on the charged surface of the photoconductive drum 6, and a hard-copy is obtained by executing conventional electrophotographic processes. In this embodiment, the resolving power of the laser beam is set to be 120 DPI.

There is provided a BD (Beam Detecting) sensor 7 at a position away from the photoconductive drum 6 in its axial direction at a predetermined distance, or a position which optically corresponds to the aforementioned position. A later-described start-write control signal is generated by a controller 11 each time before the main-scanning is carried out upon the detection of the scanning beam by the BD sensor 7.

A page memory 8 is provided for temporarily saving printing codes DSn, such as ASC11 codes, per page. Each time printing codes DSn for a certain page have been fully read out from the page memory 8 by the controller 11, a signal RQ, which indicates the termination of reading-out of the printing codes DSn, is outputted from the controller 11 to the external equipment. When the signal RQ is received at the external equipment, printing codes DSn for the next page are transmitted to the page memory 8. A transmission sequence of printing codes DSn per page is carried out depending upon an order of a so-called raster-scanning.

An H-sync signal, which is generated, at an H-sync signal generating circuit 9 and which the reception of a laser beam at the BD-sensor 7, is transmitted to the controller 11. In other words, the H-sync signal is generated at the beginning of each main-scanning. The H-sync signal is transmitted to a scan address counter 10 as well as to the controller 11.

The scan address counter 10 is an address counter for determining a scan address SAn corresponding to an address of each division constructed along a height direction in each character pattern stored in a character generator 12. The H-sync signal is counted at the scan address counter 10, and when an amount of the counted addresses reaches the predetermined addresses (in this embodiment, 20 addresses), a signal LE which indicates the termination of counting for the predetermined addresses is generated at the scan address counter 10 and transmitted to the controller 11. The scan address counter 10 is then reset for counting the next 20 addresses.

When printing codes DSn for a certain page have been fully transmitted to the page memory 8 from the external equipment, a signal Se which indicates the termination of transmission of printing codes DSn per page is outputted to the controller 11 from the external equipment. Upon receipt of the signal Se, the controller 11 sequentially outputs address data AD to the page memory 8 to read out the printing codes DSn one after another starting from the printing code of the first address in the page memory 8 as character addresses CA of a character generator 12. The controller 11 then addresses the character generator 12 with the character addresses CA. Further, the controller 11 detects start-write timing each time upon input of the H-sync signal, and outputs an enable signal pulse ST, at each start-write control timing, to a parallel/serial conversion circuit 13 described below. The controller 11 further outputs a main-scanning clock CK to the parallel/serial conversion circuit 13. The clock frequency of CK is set to correspond to 240 DPI which is higher than the frequency corresponding to the resolving power of this printer, i.e., 120 DPI.

The controller 11 addresses the page memory 8 as follows.

The controller 11 repeatedly addresses the printing codes DSn for one line until a signal LE is inputted into the controller 11. The signal LE is outputted from the scan-address counter 10 upon completion of beam scannings for each line. After receiving the signal LE, printing codes DSn for the next line are repeatedly addressed. Finally, the signal RQ is outputted to the external equipment upon input of the signal LE during the address of the printing codes DSn for the last line.

All of the fonts defined by ASCII codes corresponding to characters, numbers, and symbols are stored in the character generator 12. The character pattern thereof is given as an example character "A" illustrated in FIG. 2.

Figure 3:
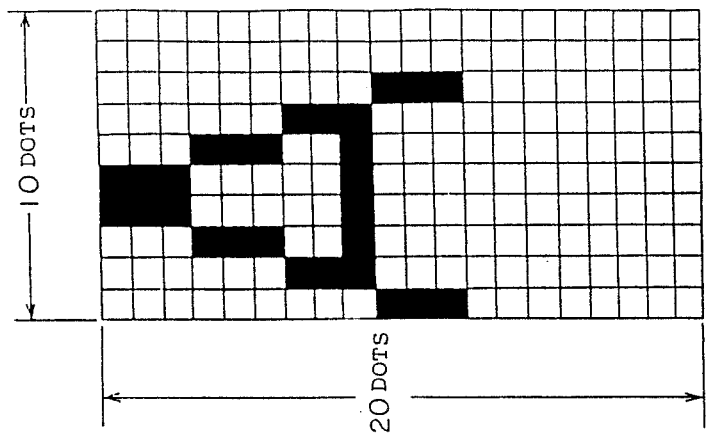
FIG. 3 is a chart showing a font of the letter "A" which has been used in a conventional printer.
Figure 2:
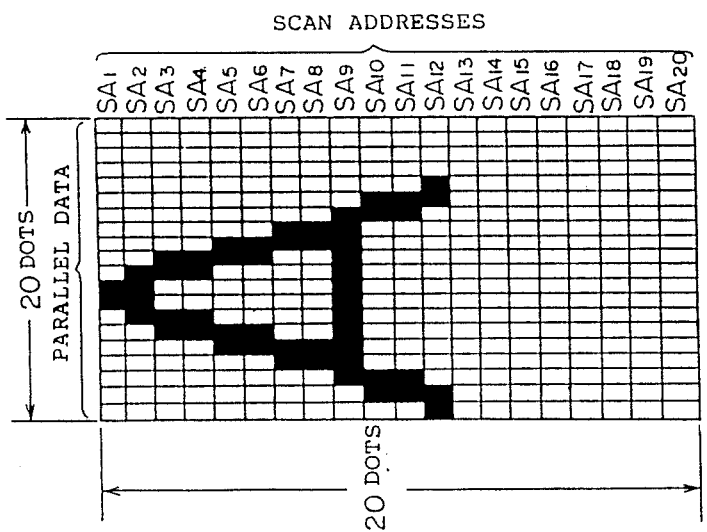
FIG. 2 is a chart showing a font of the letter "A" stored in a character generator illustrated in FIG. 1.
Figure 1:
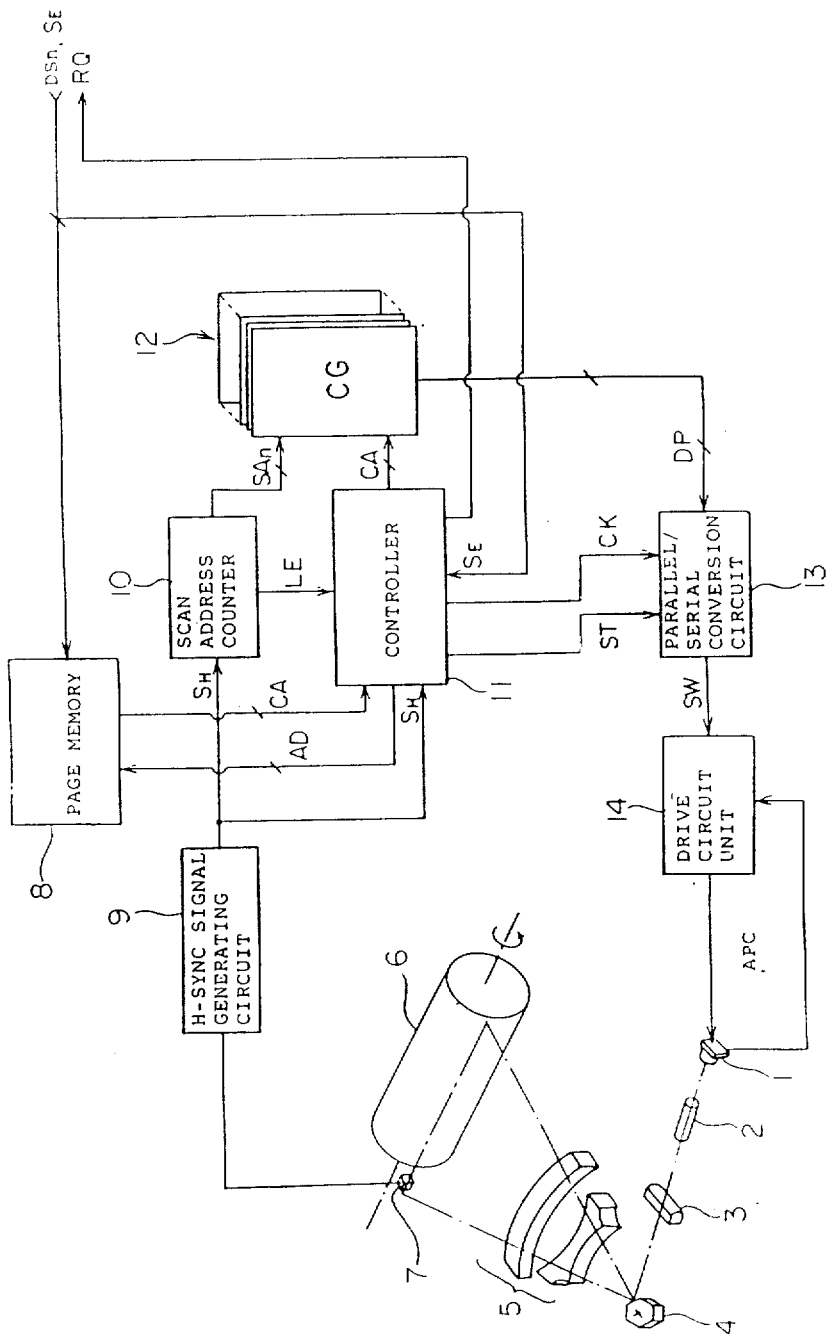
Figure 3:
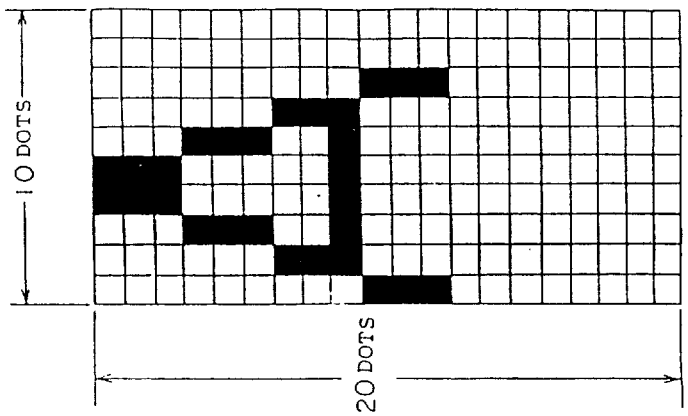
Figure 2:
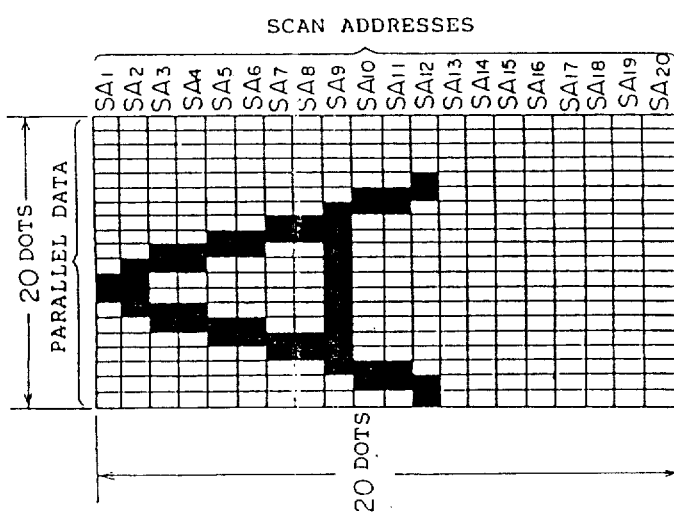

When a character is to be printed under the conditions of 12 characters/inch and 6 lines/inch, a frame-size in the character generator 12 will be 10 dots in width and 20 dots in height, because a resolving power of this printer is 120 DPI. However, in this embodiment, a frame-size in the character generator 12 is set, as shown in FIG. 2, to be 20 dots in width and 20 dots in height, and therefore an oblique line in the character "A" is represented more smoothly than the conventional one which is illustrated in FIG. 3.

That is, the number of parallel output bits, which is a width frame size, is set to be 20 which is twice of that corresponding to 120 DPI, i.e., 10. Thus the number of pattern elements is doubled in the width direction.

In this embodiment, the character generator 12 is composed of IC (Integrated Circuit), every some of which are for one character.

In the parallel/serial conversion circuit 13, while the enable signal ST is being received into the parallel/serial conversion circuit 13, parallel data DP transmitted from the character generator 12 is converted to a serial image signal SW for printing onto the photoconductive drum 6 in synchronization with the main-scanning clock CK, which is transmitted from the controller 11. An example parallel data DP for the scan address SA1 shown in FIG. 2 is "00000001100000000000". This parallel data "00000001100000000000" is converted to the serial image signal SW which constructs a clock pulse row of the data "0" or "1".

A frequency of the main-scanning clock CK transmitted to the parallel/serial conversion circuit 13 is doubled because an amount of the bits outputted from the character generator 12 is doubled. The drive circuit unit 14 caries out ON/OFF modulation of the semi-conductor laser in accordance with the serial image signal SW.

The drive circuit unit 14 further carries out a so-called auto power control (APC), which is to control drive current for the semi-conductor laser 1 to have a constant value by comparing a reference voltage with a voltage monitored by a pin-photodiode built in the semi-conductor laser 1.

In this embodiment, it is obvious that the duty ratio for the laser ON/OFF modulation is 100% because the semi-conductor laser 1 is modulated directly by the serial image signal SW transmitted from the parallel/serial conversion circuit 13.

With the above described printer, in case all the addresses in the page memory 8 are occupied with the character codes for "A", i.e., the characters "A" are to be printed all over one page, the exposure operation onto the surface of the photoconductive drum 6 is carried out as follows.

First, the parallel data "00000001100000000000" corresponding to the first scan address SA1 of the character pattern for "A" illustrated in FIG. 2 is parallely outputted from the character generator 12 based upon the output SAn of the scan address counter 10. With the above outputted parallel data DP, the semi-conductor laser 1 is modulated to be OFF for the time corresponding to 7 main-scanning clocks CK while ON for 2 clocks CK and thereafter OFF for 11 clocks CK. This pattern of ON/OFF modulation is repeated for the number of characters to be arranged on one line.

Each time the data in the scan address counter 10 is incremented with the H-sync signal SH, the above operation is repeated with the parallel data DP defined in the scan address SAn designated by the above incremented data. Thus, complete latent images for one line with characters "A" are formed on the photoconductive drum 6.

The latent images are formed on the succeeding lines by repeatedly carrying out the above operations.

In the above embodiment, the number of parallel output bits for each scan address SAn is set to correspond to 240 DPI while the number of scan address SAn continue to correspond to 120 DPI, and the frequency of the main scanning clock CK is set to be double of the frequency corresponding to 120 DPI. Accordingly, the oblique lines of the characters can be smoothly represented as illustrated in FIG. 2 with the resolving power remaining at 120 DPI, which makes the quality more desirable.

It should be noted that the minimum unit for forming a font must be two bits connected to each other along a width direction because the resolving power of this printer is 120 DPI. Regardless of the above described example, however, the resolving power is not of course to be restricted to 120 DPI. Further, the number of parallel output bits of the character pattern may, of course, not be restricted to twice that of the conventional character pattern, provided that it is larger than that corresponding to the resolving power determined by the printer.

What is claimed is:

1. An image enhancing unit adapted for use with a laser beam printer, which unit comprises:
   (a) character generator means for retrieving a character pattern to be printed, said pattern corresponding to a predetermined printing code; and
   (b) scanning clock means for generating clock pulses to form an image signal in synchronization with said clock pulses, said image signal being based upon said character pattern, and means for ON/OFF modulating a laser beam in accordance with said image signal, wherein the number of bits (n) outputted from said character generator is larger than the number of bits (m) determined by a given resolving power of said printer, said unit comprising means for increasing the frequency of said clock pulses, in comparison to a frequency corresponding to said given resolving power of said printer, in a proportion substantially equal to the ratio n/m.

2. The image organizing unit of claim 1, wherein said character pattern has a minimum-width unit used in forming a font of said character pattern, said minimum-width unit being defined by two bits connected to each other.

3. The image organizing unit of claim 2, wherein when the number of bits (n) outputted from said character generator is twice the number of bits (m) determined by a given resolving power of said printer, the frequency of said scanning clock pulses is doubled.

4. The image organizing unit of claim 1, wherein said character pattern is stored as parallel data and said image signal comprises serial data, said unit further comprising means for converting said parallel data to serial data.

5. The image organizing unit according to claim 1, wherein said scanning clock means comprises means for controlling the timing of conversion of parallel data to serial data to form said image signal.

6. A method of improving the resolution of an image without increasing the resolution setting of a laser beam printer, said method comprising:
   (a) retrieving a character pattern to be printed from a character generator, said pattern corresponding to a predetermined printing code, wherein the number of bits (n) outputted from said character generator is larger than the number of bits (m) determined by the resolution setting said printer;
   (b) generating scanning clock pulses to form an image signal, based upon said character pattern, in synchronization with said scanning clock pulses;
   (c) modulating a laser beam of said printer in accordance with said image signal; and
   (d) increasing the frequency of said scanning clock pulses, in comparison to a frequency corresponding to said resolution setting of said printer, by an amount substantially equal to the ratio n/m.

7. The method of claim 6, wherein said character pattern comprises a plurality of lines, said method further comprising:
   repeating steps (a)–(d) for each line of said character pattern.

8. The method of claim 6, further comprising forming said image signal by converting parallel data to serial data.

9. The method of claim 8, further controlling the timing of said converting of data with said scanning clock pulses.

* * * * *

UNITED STATES PATENT AND TRADEMARK OFFICE
CERTIFICATE OF CORRECTION

PATENT NO. : 4,916,546

DATED : April 10, 1990

INVENTOR(S) : K. Negishi

It is certified that error appears in the above-identified patent and that said Letters Patent is hereby corrected as shown below:

Title page:
Sheets 1-2 of the drawings, consisting of Figs. 1 and 2, should be replaced with sheets 1-3.

UNITED STATES PATENT AND TRADEMARK OFFICE
CERTIFICATE OF CORRECTION

PATENT NO. : 4,916,546
DATED : April 10, 1990
INVENTOR(S) : K. NEGISHI It is certified that error appears in the above-identified patent and that said Letters Patent is hereby corrected as shown below:

```
In the Abstract, line 4, change "a long" to ---along---.
Column 1, line 8, after "organizing" delete ",".
Column 1, line 32, after "a" delete ",".
Column 2, line 21, after "Preferred" insert ---Embodiments---.
Column 2, line 29, after "about" delete ",".
Column 2, line 57, after "generated" delete ",".
Column 2, line 58, after "which" insert ---indicates---.
Column 4, line 12, change "caries" to ---carries---.
```

Signed and Sealed this

Fifteenth Day of September, 1992

*Attest:*

DOUGLAS B. COMER

*Attesting Officer*   *Acting Commissioner of Patents and Trademarks*